US012684245B2

(12) United States Patent
Saheli et al.

(10) Patent No.: US 12,684,245 B2
(45) Date of Patent: Jul. 14, 2026

(54) EXPOSURE TIME CONTROL FOR IMAGING DEVICE

(71) Applicant: Aptiv Technologies AG, Schaffhausen (CH)

(72) Inventors: Ali Saheli, Wuppertal (DE); Alexander Barth, Wermelskirchen (DE)

(73) Assignee: Aptiv Technologies AG, Schaffhausen (CH)

( * ) Notice: Subject to any disclaimer, the term of this patent is extended or adjusted under 35 U.S.C. 154(b) by 163 days.

(21) Appl. No.: 18/424,780

(22) Filed: Jan. 27, 2024

(65) Prior Publication Data

US 2024/0259693 A1     Aug. 1, 2024

(30) Foreign Application Priority Data

Jan. 27, 2023    (EP) ..................................... 23153714

(51) Int. Cl.
| | |
|---|---|
| *H04N 23/73* | (2023.01) |
| *H04N 23/611* | (2023.01) |
| *H04N 23/71* | (2023.01) |
| *G06V 20/59* | (2022.01) |

(52) U.S. Cl.
CPC ........... *H04N 23/73* (2023.01); *H04N 23/611* (2023.01); *H04N 23/71* (2023.01); *G06V 20/593* (2022.01); *G06V 20/597* (2022.01)

(58) Field of Classification Search
CPC ...... H04N 23/73; H04N 23/71; H04N 23/611; G06V 20/597; G06V 20/593
USPC ......................................................... 348/148
See application file for complete search history.

(56) References Cited

U.S. PATENT DOCUMENTS

| | | | | |
|---|---|---|---|---|
| 10,735,664 | B2 * | 8/2020 | Kunihiro | .............. G06V 40/161 |
| 2005/0030415 | A1 | 2/2005 | Takizawa | |
| 2006/0164524 | A1 * | 7/2006 | Shibano | ................... H04N 5/20 |
| | | | | 348/E5.073 |
| 2012/0155764 | A1 | 6/2012 | Ogura | |
| 2018/0131880 | A1 | 5/2018 | Hicks | |

FOREIGN PATENT DOCUMENTS

| | | |
|---|---|---|
| CN | 105578068 A | 5/2016 |
| CN | 110958398 A | 4/2020 |
| EP | 3886069 A1 | 9/2021 |

(Continued)

OTHER PUBLICATIONS

Extended European Search Report for EP23153714.3, 20 pages, Sep. 26, 2023.

*Primary Examiner* — Sath V Perungavoor
*Assistant Examiner* — Kristin Dobbs
(74) *Attorney, Agent, or Firm* — Miller Johnson

(57) ABSTRACT

A computer-implemented method for controlling the exposure time of an imaging device includes obtaining imaging data from the imaging device. The imaging data is grouped in one or more regions. Each region is associated with a weighting coefficient. The method includes modifying one or more of the weighting coefficients based on light intensity values obtained from the imaging data and being of the associated regions. The method includes determining, based on the obtained imaging data and the weighting coefficients, a light intensity value for at least a part of the imaging data. The method includes adapting, based on the light intensity value, the exposure time of the imaging device.

18 Claims, 6 Drawing Sheets

(56)            References Cited

FOREIGN PATENT DOCUMENTS

| JP | 2007166028 | A | | 6/2007 |
| JP | 2009003456 | A | * | 1/2009 |
| JP | 4777397 | B2 | | 9/2011 |
| KR | 20120055824 | A | | 6/2012 |
| KR | 20180086646 | A | | 8/2018 |

* cited by examiner

100

110

140

100

130      120

100

122 (A)     124 (C)

1

1

EXPOSURE TIME CONTROL FOR IMAGING DEVICE

CROSS-REFERENCE TO RELATED APPLICATIONS

This application claims priority to EP 23 153 714 filed Jan. 27, 2023, the entire disclosure of which is incorporated by reference.

FIELD

The present disclosure relates to computer-controlled imaging and more particularly to controlling exposure time of an imaging device.

BACKGROUND

Nowadays, vehicles, such as cars are facing a paradigm shift towards software driven platforms with advanced sensing and control means so as to provide some degree of assistance to the driver. One example is an in-cabin sensing camera for monitoring the driver and/or cabin state. Typically, near infrared (NIR) cameras, color cameras (RGB cameras), and combined color-NIR cameras are employed.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Such cameras are capturing images that are subject to strong variations of light conditions and, hence, the brightness of the image. For instance, regions in proximity to a window of the vehicle cabin may be rather bright or dark depending on the environmental conditions (e.g. daytime, nighttime, regional variations, or the like). Further, objects close to the camera also contribute to such variations, as they typically reflect emitted IR light back to the lens of the camera. The object close to the camera causing the reflection consequently appears rather bright. In case of a high reflection, the image sensor can saturate, thus, the quality of the image is degraded. Further still, there are often elements in a scenery that are highly reflective, such as warning vests, accessories worn by passengers, or the like, which can compromise the image. In addition, all these variations are typically time dependent. Overall, these variations culminate in images that have rather bright and rather dark regions.

It would be desirable that such cameras are capable of capturing the scenery more appropriately and particularly to compensate for the strong variations of the light conditions so as to improve the image quality.

Aspects of the present disclosure are set out in the accompanying independent and dependent claims. Combinations of features from the dependent claims may be combined with features of the independent claims as appropriate and not merely as explicitly set out in the claims.

In an aspect, the present invention concerns a computer-implemented method for controlling the exposure time of an imaging device, the method comprising: obtaining imaging data from the imaging device, the imaging data being grouped in one or more regions, wherein each region is associated with a weighting coefficient; modifying one or more of the weighting coefficients based on light intensity values obtained from the imaging data and being of the associated regions; determining, based on the obtained imaging data and the weighting coefficients, a light intensity value for at least a part of the imaging data; adapting, based on the light intensity value, the exposure time of the imaging device.

In this manner, the present disclosure allows to improve capturing (also meant to encompass the terms representing, showing, resembling) the imaging data. Thereby, the imaging data is captured more accurately. Thereby, relevant regions of the imaging data can be recognized more precisely. For instance, relevant regions appear thus not saturated or even over saturated (having a rather high intensity). Further, relevant regions appear thus not too dark. As an example, by way of the adjusted exposure time, a driver's face may be captured better. Hence, this could improve safety. For instance, the imaging device could be employed to detect a state associated with an awareness of the driver, such as whether the driver is alert or not. Thereby, microsleeping or the like of the driver may be appropriately prevented. Representing the driver for such purpose more accurately is of significant importance.

The inventors found that providing for a link between the weighting coefficients of the regions and the light intensity values of the respective associated regions aids in ensuring the afore-mentioned advantages. Thereby, regions with higher or lower intensity can be factored in more or less.

The one or more regions may be one or more pixels of the imaging data. A region may comprise more than one pixel. In one example, a region comprising more than one pixel may be advantageous as it makes the method more efficient.

The term "light intensity" (also used as "intensity" herein for brevity) may be the power per unit area and can be referred to as a physical quantity. It is a quantity that is associated with the brightness. The brightness may be influenced of how a human visually perceives light. In one example, the intensity value may be defined in digital numbers of pixels. Further, the intensity value of the associated regions may be the average intensity of all pixels comprised by the region.

Further still, the intensity value for at least a part of the imaging data may be the average intensity of all pixels comprised by the at least a part of the imaging data (this may comprise substantially all pixels of the imaging data). The step of determining the light intensity value for at least a part of the imaging data may comprise that each modified weighting coefficient is multiplied with the light intensity value of the associated regions and averaged for the respective regions. In this manner, the term "light intensity for at least a part of the imaging data" is understood by the skilled person.

The term "exposure time" may be understood as the period of exposure and may be the time span for which a film of a traditional camera and/or a sensor of a modern digital camera is exposed to light so as to record an image.

The method according to the present disclosure can be employed to any kind of imaging device. The imaging device may be a camera, such as an in-cabin camera of a vehicle. For instance, it could be an NIR or a color (RGB)-IR cabin camera. It is appreciated that the method according to the present disclosure allows to adapt an auto-exposure control of such cabin cameras.

In a various embodiment, the method is further comprising excluding from determining the light intensity value, one or more first regions having a light intensity above a predefined upper threshold.

With this embodiment, first regions are not taken into account to determine the light intensity value of at least a part of the imaging data. This has the advantage that first regions that have a rather high intensity (these regions may be saturated and or oversaturated) do not influence the light intensity value of at least a part of the imaging data.

This may prevent that an exposure time is reduced in an attempt to capture the first regions appropriately, because typically the upper threshold is rather high such that the first regions could not be captured accurately, even if the exposure time were substantially reduced. Thereby, remaining regions of the imaging data are captured accurately.

A warning vest and/or an object in proximity to the imaging device may be an example encompassed by such a first region.

Such a first region may be a region, which is rather bright even if the exposure time of the imaging device is reduced to a substantially lowest reasonable value during ordinary use of the imaging device.

It may be possible that the first regions are identified as first regions if the exposure time is below a defined exposure time threshold. This may ensure that merely regions are excluded which are rather bright although the exposure time is below a lower exposure time threshold.

The step of excluding from determining the light intensity value, one or more first regions may be particularly advantageous when combined with modifying one or more of the weighting coefficients. As an example, in case elements with rather high intensities are weighted with a value of two, while elements with rather low intensities are weighted with a value of one (e.g. remain the same), an average intensity value may still be 255 in one example (0 being the minimum, 255 being the maximum, as described elsewhere herein). Thereby, the exposure time may be reduced in order to decrease the intensity. In this manner, when the sensitivity to elements with rather high intensities is increased (value of two), excluding one or more first regions may be particularly advantageous. Thereby, rather bright regions that stay bright (e.g. even if the exposure time is reduced to a substantially lowest reasonable value during ordinary use of the imaging device) are beneficially excluded. In one example, it may be possible that brightness of regions encompassing a driver's face can be reduced by adjusting the exposure time, but this may not be possible for highly reflective elements.

In a further various embodiment, the method comprises excluding from determining the light intensity value, one or more second regions having a light intensity above a predefined lower threshold, lower than the predefined upper threshold, if the one or more second regions are neighboring at least one first region.

Same as described herein with respect to the first regions, also the second regions are excluded. Thus, the respective advantages described herein with respect to the first regions are likewise applicable.

Further, this further various embodiment has the advantage that also second regions are excluded, which may still have a rather high intensity (which could be lower than the intensity of the first regions) and are in neighboring at least one first region. Thus, first and second regions, which are considered detrimental for capturing relevant regions of the imaging data, are beneficially excluded. This may be described in greater detail elsewhere herein with respect to the "hysteresis threshold".

The term "neighboring" may encompass that the second region is in proximity to a first region. For instance, the second region may be abutting a first region and/or contacting a border of a first region. In one example, the second region may be spaced apart from a first region.

The predefined upper and/or lower threshold may depend on the bit depth of the imaging data. As an example, for 8-bit images the maximum value is 255. To illustrate this, 8-bit images may be stored in the form of a matrix of numbers in a computer, these numbers may then be referred to as pixel values. The pixel values may represent the intensity of each pixel: 0 represents black and 255 represents white. For 8-bit images, a suitable upper threshold may be about at least 200 (78% of the maximum value 255), 210 (82%) or 220 (86%).

In another example, for 10-bit images the maximum value is 1023. Hence, a suitable upper threshold may be about at least 800 (78% of the maximum value 1023), 900 (88%) or 1000 (97%).

As understood, in yet a further example concerning 12-bit images, the maximum value is 4095. It may be possible that for any kind of bitrate of images a suitable relative threshold with respect to the maximum value is defined. Thereby, a suitable predefined upper threshold may be about at least 75%, at least 80%, at least 85%, at least 90%, at least 95%, at least 97% of the maximum value.

It may be possible that the predefined lower threshold may be about 1%-point, 2%-points, 3%-points, 4%-points, or 5%-points lower than the respective predefined upper threshold (e.g. an upper threshold of 90% may entail a lower threshold of 89% to 85%).

Excluding the first and/or second regions further requires that the first and/or second regions have a light intensity above the predefined upper threshold and/or above the predefined lower threshold at least N times for N consecutive imaging data of a sequence of frames obtained by the imaging device. N is an integer of at least 1. In one example, this condition may be referred to herein as a count threshold as described elsewhere in greater detail.

It is noted that (the integer) N may depend on the framerate (i.e. frames per second) of the imaging device and/or a desired sensitivity at which excluding should be performed. As understood by the skilled person, (the integer) N may be selected such that the first/second regions are detected as being substantially stationary regions that have a rather high intensity.

In some examples, the number N may be at least 2, at least 5, or at least 10, and/or at most 100, at most 80, at most 60, or at most 50.

This has the advantage that the first and second regions may not already be excluded if they occur merely one time (e.g. N=1), as such occurrence may be caused by noise or the like. Thus, it could be beneficial to increase the number N to encounter this.

In a various embodiment, modifying one or more of the weighting coefficients comprises increasing each value of the weighting coefficients if the light intensity value of the associated region is above a first threshold.

This has the advantage that regions with higher intensity are taken more into consideration. For instance, a driver's face may usually be a region of higher intensity. This may be a relevant region to capture accurately. Thus, the above embodiment ensures that this region is not oversaturated due to an increased exposure time.

Modifying one or more of the weighting coefficients comprises decreasing each value of the weighting coefficients if the light intensity value of the associated region is lower than a second threshold; wherein the first threshold is greater than the second threshold.

This has the advantage that regions, which may not be as relevant (e.g. darker co-driver's seats) as driver's faces (usually brighter) are less factored in.

This is described in more detail elsewhere herein with respect to typical cabin scenarios wherein the presence of a co-driver can adversely influence capturing such relevant region. Thereby, the present disclosure provides for measure to improve this. This increase safety. However, as also described herein, the present invention facilitates that the imaging device serves multiple purposes at substantially the same time (e.g. in case a driver's awareness should be sensed and passengers, particularly on rear seats should be detected).

In a various embodiment, modifying one or more of the weighting coefficients comprises modifying the values of the weighting coefficients based on a functional relationship to the light intensity of the associated regions, based on a transfer function, such as a sigmoid shaped transfer function.

The functional relationship has the advantage that the coefficients can be accurately modified based on previously derived data, which has proven to be applicable and to aid in representing relevant regions more accurately. As an example, the coefficients may be scaled based on the functional value of the relationship. This may be a floating-point value between 0 and 1 for floating point implementations or integer numbers, applicable in fixed point implementations. Certainly any kind of transfer functions are possible according to the present disclosure.

Excluding the first and/or second regions is further based on motion tracking information of the first and/or second regions.

This may be understood such that first and second regions are detected by way of motion tracking information to correspond to a coherent region, respectively. For instance, a hand close to the imaging device may be moving from one location to another location of the imaging data. Thereby, it is advantageous if such moving regions are detected as such regions and, excluded if the respective upper/lower threshold condition is met.

As described elsewhere herein, the implementation of such motion tracking and the counting of the N times may be referred to as an intensity count map. The intensity count map may be updated continuously. When motion tracking information of the first and/or second regions is employed in combination with the counting of the N times, the intensity count map may be modified before updating the intensity count map as described herein. Such modification may comprise that the first and/or second regions are shifted according to the object/part that is tracked via motion.

In a various embodiment, the method is further comprising obtaining additional information of the imaging data and/or of the imaging device; enabling and/or disabling, based on the obtained additional information, excluding the first and/or second regions.

This may be advantageous since excluding could be enabled and/or disabled only in relevant situations.

The additional information are one or more of the followings: an exposure time of the imaging device of one or more preceding imaging data, of the preceding imaging data; motion tracking information, over one or more consecutive imaging data of a sequence of frames obtained by the imaging device; motion tracking information indicative of a moving object, such as a part of a human body, over one or more consecutive imaging data of a sequence of frames obtained by the imaging device.

This has the advantage that excluding could be disabled if the exposure time is rather high. In such a situation in may be possible to render regions of high intensity more recognizable by reducing the exposure time without necessarily excluding the first/second regions.

Further, if the imaging device is operated at rather low exposure time (e.g. obtained as additional information from the previous frame), and still the regions would appear rather bright (e.g. have a high intensity) the excluding may be advantageously enabled. In such situations, excluding has proven to be beneficial.

In a various embodiment, adapting the exposure time of the imaging device further comprises increasing the exposure time of the imaging device if the determined light intensity value for at least a part of the imaging data is lower than an image threshold; and/or decreasing the exposure time of the imaging device if the determined light intensity value for at least a part of the imaging data is above the image threshold.

This has the advantage that the exposure time is increased if the determined light intensity value is lower than an image threshold. In particular, the imaging data may appear rather dark in such a case. Thereby, increasing the exposure time aids to increase the intensity. Vice versa, the exposure time is beneficially decreased if the determined light intensity value is above the image threshold. This may aid in darkening the imaging data.

It is appreciated that the threshold may be adjusted according to the use case of the method of the present disclosure.

A further aspect of the present disclosure relates to a computer-implemented method for sensing an interior environment of a vehicle, a cabin of a vehicle, the method comprising: performing the method (for controlling the exposure time of an imaging device) as described herein; obtaining further imaging data based on the adapted exposure time of the imaging device; determining, based on the imaging data, one or more characteristics of the interior environment of the vehicle.

The step of determining one or more characteristics comprises one or more of the following: determining whether a driver of the vehicle is alert/awake, drowsy, microsleeping, or sleeping; determining the number of passengers of the vehicle; determining a gaze direction of the driver.

In this manner, the method facilitates determining a state of the driver, such as a state associated with an awareness of the driver. The method of this further aspect may incorporate all advantages of the method for controlling the exposure time of an imaging device as described herein.

In particular, the method for sensing an interior environment of a vehicle may aid in sensing and/or properly encountering if a driver is not alert. It is appreciated that such a state is sensed to provide for suitable measures to prevent a driver's state, with reduced awareness, such as drowsy and microsleeps, e.g. a time of one or more seconds during which the driver falls asleep. Thereby, the method may reduce risks and/or dangerous situations for drivers, since potential serious mistakes of the driver, e.g. at the car's wheel, may be overcome. Same advantages apply to the gaze direction of the driver. Further, additional sensing may aid to increase safety and/or driver comfort in any kind of situations (e.g. number of passengers). It is noted that further scales pertain that are encompassed by the present disclosure and are associated with the state of the driver, such as Karolinska Sleepiness Scale (KSS).

The imaging device as described herein serves multiple purposes at substantially the same time. For instance, a driver's state may be sensed (the driver should be recognizable) and detecting further passengers in the cabin, such as passengers in rear seats (the further passengers should be recognizable). Such conflicting requirements for the exposure time (e.g. for the further passengers, particularly in rear seats, the exposure time should be increased; for the driver, the exposure time should be decreased) can be beneficially encountered by way of modifying one or more of the weighting coefficients based on light intensity values of the associated regions. In this manner, rather bright regions (e.g. the driver) are not compromising the image (e.g. darken the rear seats) such that further passengers, particularly in rear seats, are not recognizable the image. Same applies vice versa, e.g. rather dark regions likewise are not compromising the image.

A further aspect of the present disclosure relates to a data processing apparatus comprising means for carrying out one of more of the method steps as described herein.

Yet a further aspect of the present disclosure relates to computer program comprising instructions, which when executed by a computer, cause the computer to carry out one of more of the method steps as described herein.

Another aspect of the present disclosure relates to a vehicle comprising the apparatus as described herein, optionally further comprising an imaging device, such as a camera.

Moreover, the apparatus, computer program and vehicle as outlined herein may include means for implementing all aspects and/or embodiments as outlined herein, even if these may rather be described in the context of method steps. Furthermore, the features and advantages described with reference to the method steps may equally be applicable to the apparatus, computer program, and vehicle.

It is also to be understood that the features and advantages described with reference to an apparatus, computer program, and vehicle may equally be applicable to the method steps.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Various aspects of the present disclosure are described in more detail in the following by reference to the accompanying figures without the present disclosure being limited to the embodiments of these figures.

In the drawings, reference numbers may be reused to identify similar and/or identical elements.

DETAILED DESCRIPTION

The term "imaging data" as used herein may be one image or a plurality of images. Further, term "imaging data" may be one "frame" or a plurality of frames. For instance, the term "imaging data" may be a frame of a sequence of frames.

The term "color" camera as used (which may be a RGB camera) may be understood as sensors that are sensitive in the visible electromagnetic spectrum. RGB-IR cameras may refer to sensors with a color filter array (also termed grid) configuration. In such array configuration different pixels may have different sensitivity for colors, e.g., red (R), green (G), blue (B), and/or IR wavelength. In one example, via demosaicing algorithms, it is possible to convert RAW sensor image into a color image, for example in RGB color space (e.g., red, green, blue channels). Different representations, for the color and intensity are certainly possible, e.g., YUV representation or the like.

Figure 1:
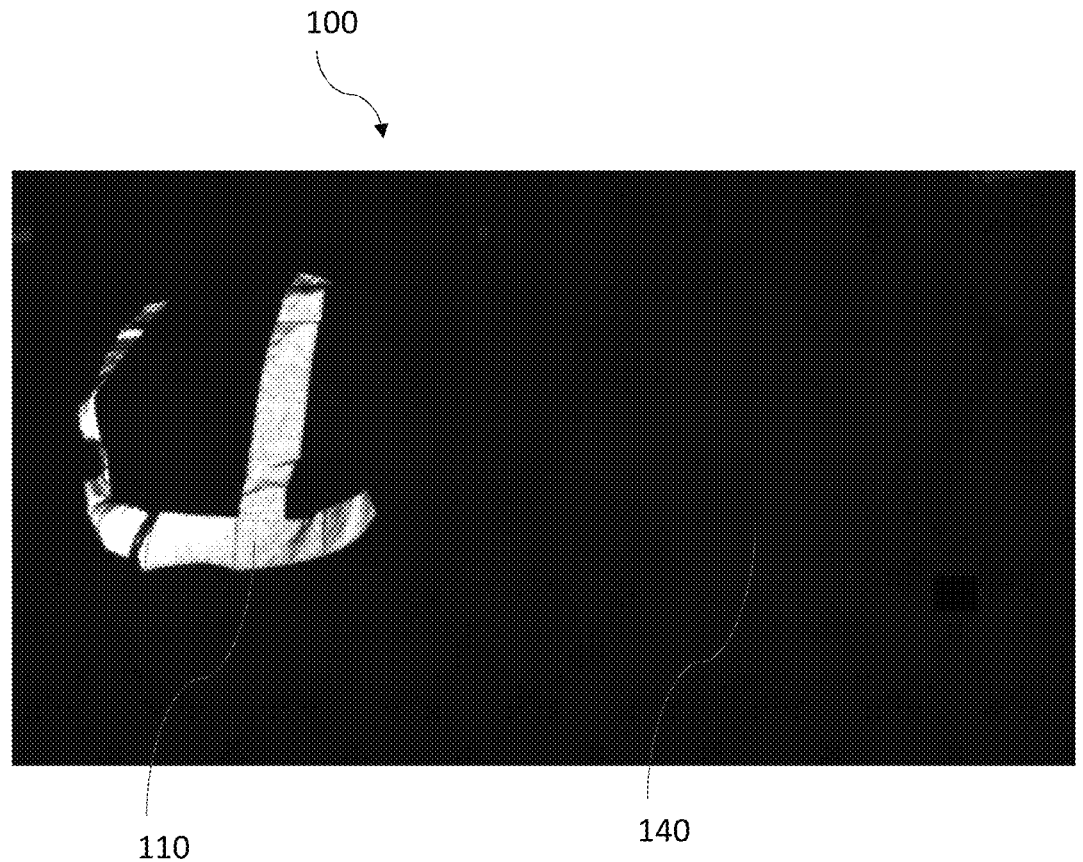
FIG. 1 shows an example image from an imaging device with a highly reflective region and a black region.

FIG. 1 shows an example image 100 from an imaging device with a highly reflective element (which may be referred to herein as first/second region) 110 and a black region 140. The highly reflective element 110 is oversaturated although the exposure time of conventionally employed auto exposure methods is rather low. The reduced exposure time causes the remaining regions of the image to become black. Accordingly, a driver's face may not be captured appropriately.

Figure 2:
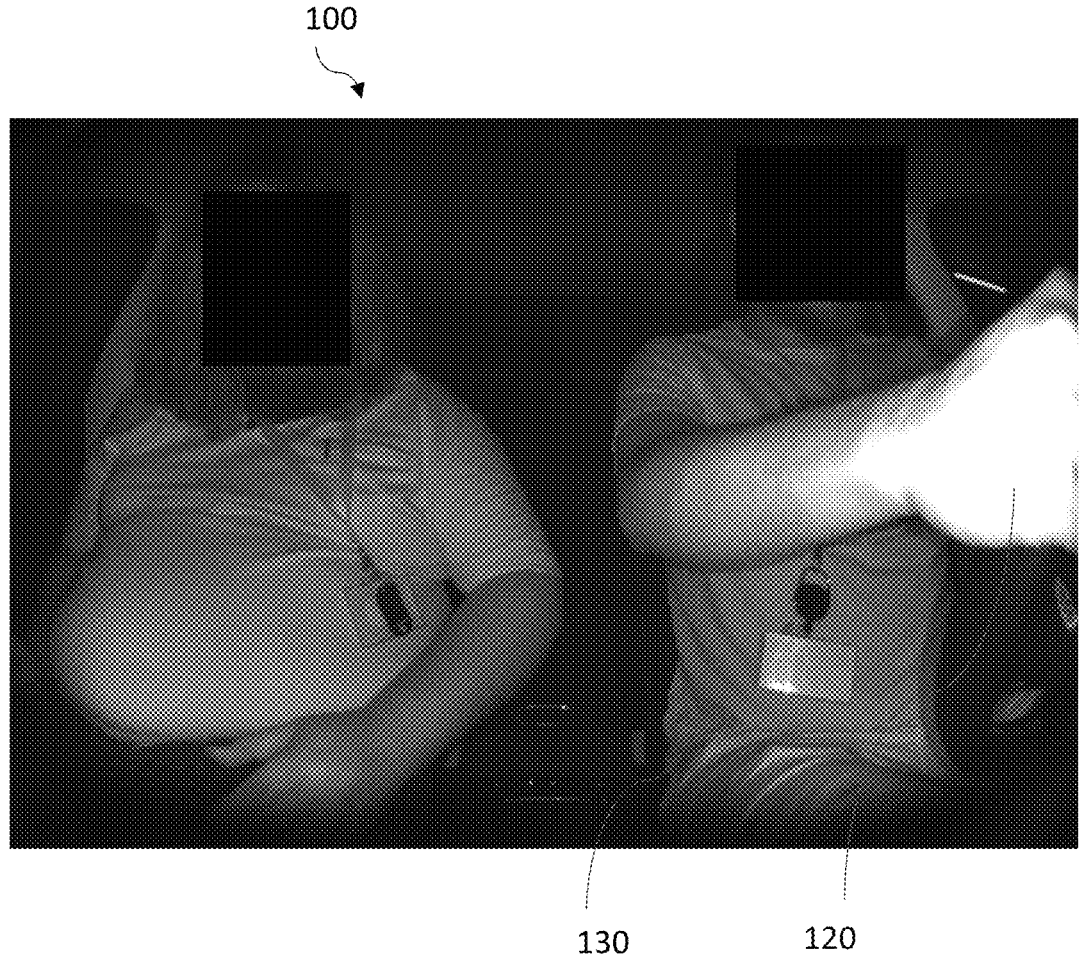
FIG. 2 shows an example image from an imaging device with a bright and saturated region close to the imaging device and darker regions.

FIG. 2 shows an example image 100 from an imaging device with a bright and saturated region 120 close to the imaging device and darker regions 130. The bright and saturated region 120 stems from a driver's arm and/or hand, which reflects projected IR light from vertical-cavity surface emitting laser (VCSEL). It may also be possible that LED light sources are employed and a driver's arm and/or hand reflects light originating therefrom.

Figure 3:
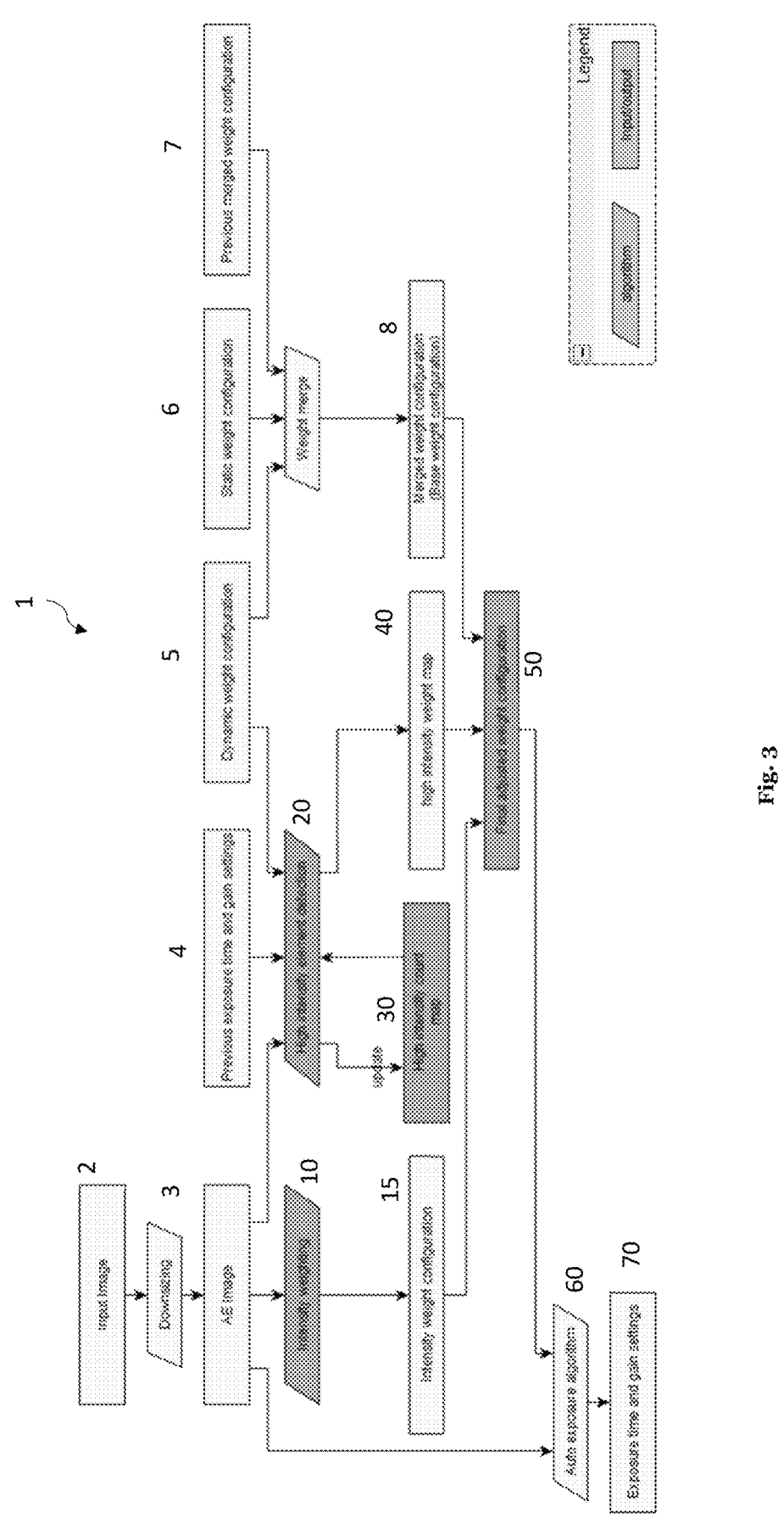
FIG. 3 shows an example implementation of the method according to an embodiment of the disclosure.

FIG. 3 shows an example implementation of the method according to an embodiment of the disclosure. The imaging data may be obtained in step 2.

In an optional step 3, the input imaging data may be resized from a higher resolution to a smaller resolution. Thereby, the efficiency of the method may be enhanced. Further, an impact of noise may be reduced. As an example, if the camera is an RGB-IR camera, the raw image data obtained from the camera may be converted to an IR intensity image before further being processed. Any image types and/or color filter array (CFA) configurations may be applicable according to the present disclosure, such as NIR images, RCCC images, or the like.

The weighting coefficients used for determining the intensity value for at least a part of the image may be defined for each image's pixel. Thus, the number of weighting coefficients may correspond to the number of pixels (e.g., the width in pixel times the height in pixel). However, the number of weighting coefficients may also be smaller to increase efficiency. For instance, it may be possible to reduce the number of weighting coefficients by a parametric model. One example of such a parametric model may comprise bounding boxes encompassing one or more pixels which are assigned with an average weighting coefficient.

The weighting coefficients may be obtained by at least one, at least two, or all three of the following configurations: A dynamic weight configuration 5, e.g., using inputs from high-level algorithms such as face detection or body detection, a static configuration 6, e.g., fixed settings for a given cabin, and a previous merged weight configuration 7, e.g., for some temporal smoothing the results of the previous frame, or for the inclusion of other history information. Further, the weighting coefficients may be obtained by other configurations not explicitly mentioned herein.

The afore mentioned obtained weighting coefficients may be independent of the intensity values of the associated regions of the image. However, these intensity values typically differ from one region to another region (e.g., they differ in location) of the image, as explained in the following two scenarios.

In a first typical vehicle cabin scenario, the driver seat may be occupied by a driver, which may appear rather bright (e.g. attributable to the face and/or due to rather bright clothing, which increase the light intensity). In addition, the driver may be illuminated, for instance by active illumination and/or ambient illumination. The co-driver seat may be empty and, hence, rather dark (e.g. less bright). Taking a weighted average intensity of the two regions (driver seat and co-driver seat) of the image and assuming both seats are equally weighted (the weighting coefficients are substantially the same), this may lead to determining a medium intensity value of the part of the image. If this determined medium intensity value is close to the image threshold (decisive for adapting the exposure time), the control algorithm may not necessarily adapt the exposure to a great extent.

In a second typical vehicle cabin scenario a passenger may occupy the co-driver seat. Thereby, both regions (driver and co-driver seats) may have a higher intensity. The weighted average intensity of the two regions of the image may thus be brighter (assuming the same fixed weighting coefficients set out in the first typical scenario). If this determined brighter intensity value exceeds the image threshold, the exposure time would be decreased so as to darken the image.

Thus, the co-driver's region and/or seat (generally speaking any object) may influence the brightness of the driver seat and vice versa. This can adversely affect capturing the driver accurately. Such capturing may be important to increase safety and may be established by way of the following.

It is appreciated if that influence of dark and/or bright regions of the image are taken into consideration by applying adaptive weighting (step 10, which may correspond to modifying one or more of the weighting coefficients as described elsewhere herein).

Such adaptive weighting may comprise increasing each value of the one or more weighting coefficients associated with rather bright regions. It may additionally or alternatively comprise decreasing each value of the one or more weighting coefficients of rather dark regions. It is noted that such modification of the weighting coefficients based on the intensity of a region of the image is particularly advantageous in typical scenarios of vehicle cabins. For instance, usually driver/passengers have rather bright regions (e.g. faces). This may allow to capture the relevant regions more accurately. This may be irrespective of whether the driver/passengers are wearing clothing with rather small IR reflectivity. It is to be noted that differences shown in the visible light spectrum (RGB) (e.g. skin colors) may have much lower variation in IR spectrum.

According to an embodiment of the method of the present disclosure, the afore-mentioned adaptive weighting as performed in step 10, leads to an intensity weight configuration comprising intensity weighting coefficients (step 15 of FIG. 3).

Figure 4:
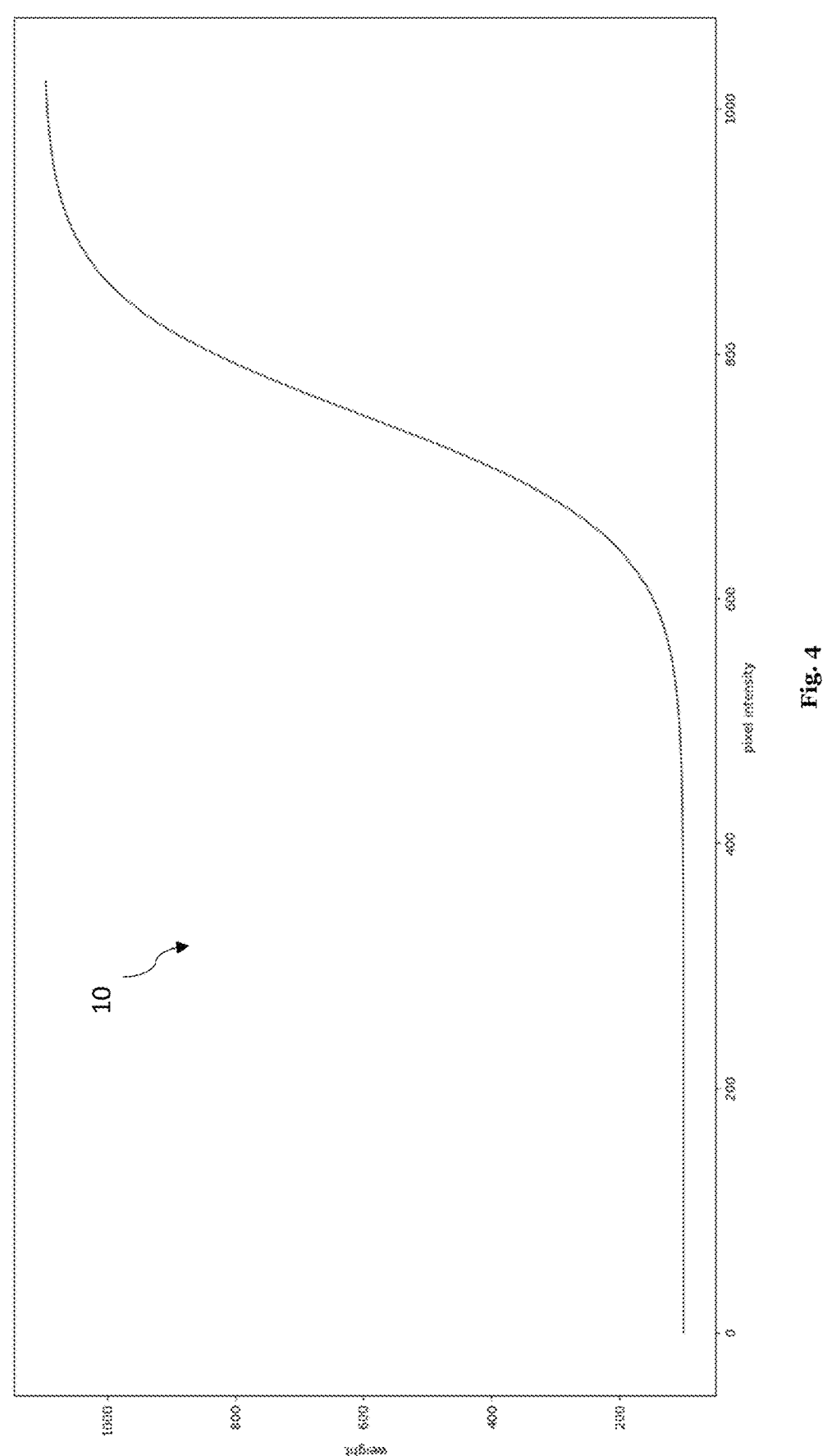
FIG. 4 shows a sigmoid shaped transfer function to assign larger weights to the brighter pixels and smaller weights to the darker regions according to an embodiment of the present disclosure.

FIG. 4 shows some further details as to how the weighting coefficients may be increased and/or decreased based on the intensity value of associated regions.

Further, the method of the present disclosure may comprise detection of first and/or second regions as described in the summary of the present disclosure. Examples of first and/or second regions may be highly reflective elements in the image (step 20 in FIG. 3). As mentioned herein, such highly reflective elements can dominate the exposure time but remain rather bright as the exposure time cannot compensate this (even if the lowest possible exposure time were employed). Warning vests and objects close to the imaging device may be examples of such highly reflective elements.

Adapting the exposure time due to the presence of highly reflective elements may compromise capturing relevant elements such as a driver's face appropriately.

In one example, the method may detect such highly reflective elements by comparing the light intensity value associated with a region (e.g. one or more pixels) with a predefined upper/lower threshold. Further, a high intensity count map (indicated by reference numeral 30 in FIG. 3) may be provided, which could have the same size of the image (e.g. pixels in width times pixels in height). The high intensity count map may be initialized with zeros. If a region meets or exceeds the predefined upper/lower threshold, a respective counter (integer N) in the high intensity count map is increased by one. If a region's intensity is below the predefined upper/lower threshold, the respective counter is reset to zero.

Determination of the predefined upper/lower threshold is described with reference to FIG. 5 in greater detail.

In one example, if a counter (integer N) of the high intensity count map is greater than a count threshold, the respective weighting coefficient(s) of that region (e.g. one or more pixels) is(are) set to zero.

Setting the weighting coefficients to zero ensures that the regions do not contribute to determining the light intensity value of at least a part of the image. Hence, the method has the advantage that the remaining regions of the image may not be unnecessarily darken.

Moreover, the method may comprise detecting the highly reflective elements over a N consecutive frames, thereby continuously updating the high intensity count map. It is noted that some highly reflective elements should not already be excluded if they occur merely one time (e.g. having a counter of 1), as such occurrence may be caused by noise or the like.

The highly reflective elements may be moving across the image over consecutive frames and continue contributing to the determined light intensity value of the part of the image in respective varying regions of the image. To address this, the method may comprise motion tracking of highly reflective elements. Thereby, the highly reflective elements may be recognized as such elements over consecutive frames. Hence, the intensity count map may be updated taking into account varying regions/pixels of the image. This may improve capturing the image more accurately.

As described elsewhere herein in greater detail, the intensity count map may be modified before it is (continuously) updated. Such modification may be illustrated in the following example: if an object/part was located at (x1, y1) of the image at time t and it is traced that the object/part has moved to location (x2, y2) of the image, the count in location (x2, y2) is set to the count of location (x1, y1).

Subsequent to such modification, the count in location (x2, y2) may be increased, e.g. increased by the integer one. In general for each location (which may also be referred to as cell index) a displacement vector may be obtained, based on motion tracking information. The displacement vector may be associated with the traced objection/part.

In one example, excluding the highly reflective elements can be enabled and/or disabled. Such enabling and/or disabling may be based on additional information, such as previous/current exposure time and gain settings (indicated by reference numeral 4 in FIG. 3). One use case may be to enable excluding of highly reflective elements only if the camera is operated at a rather low exposure time and gain settings, and still the pixels appear rather bright.

Further, enabling and/or disabling of excluding highly reflective elements may additionally or alternatively be based on information from the dynamic weight configuration 5. As described elsewhere herein, the dynamic weight configuration 5 may employ inputs from high-level algorithms such as face detection and/or body detection. Using this information gives rise to further use cases, wherein it may be beneficial to disable excluding highly reflective elements if these elements stem from (moving) regions that are associated with a human body part, such as a face. It is desired to capture such regions accurately. Hence, in such a use case, excluding should be disabled although a highly reflective element may be detected.

Further use cases are certainly also possible and encompassed.

Eventually, a high intensity weight map (reference numeral 40 in FIG. 3) is computed, comprising values between 0 and 1.

The final adjusted weighting coefficients 50 may be derived from the following three configurations: the base weight configuration 8, the high intensity weight map 40 and the intensity weight configuration 15.

As an example, the three configurations 8, 40, 15 may be merged by multiplication. Further examples are certainly encompassed by the present disclosure.

The final adjusted weight configuration 50 is then used together with the imaging data in the auto exposure algorithm 60 to determine exposure time and gain settings 70.

FIG. 4 shows a sigmoid shaped transfer function used to determine adaptive weighting coefficients. The function may be employed to assign larger weights to brighter regions and smaller weights to the darker regions. Thereby the determined light intensity value of the image will be higher, hence the exposure time may be reduced, and the image may become darker. Accordingly, saturation of bright regions is beneficially reduced. As understood, the function may be parameterized differently so as to adjust the influence of bright and dark regions in a flexible manner. In one example, the y axis value could be mapped to a floating-point value between 0 and 1 for floating point weight maps. Larger integer numbers as shown in this figure may be used in fixed point implementations.

Figure 5:
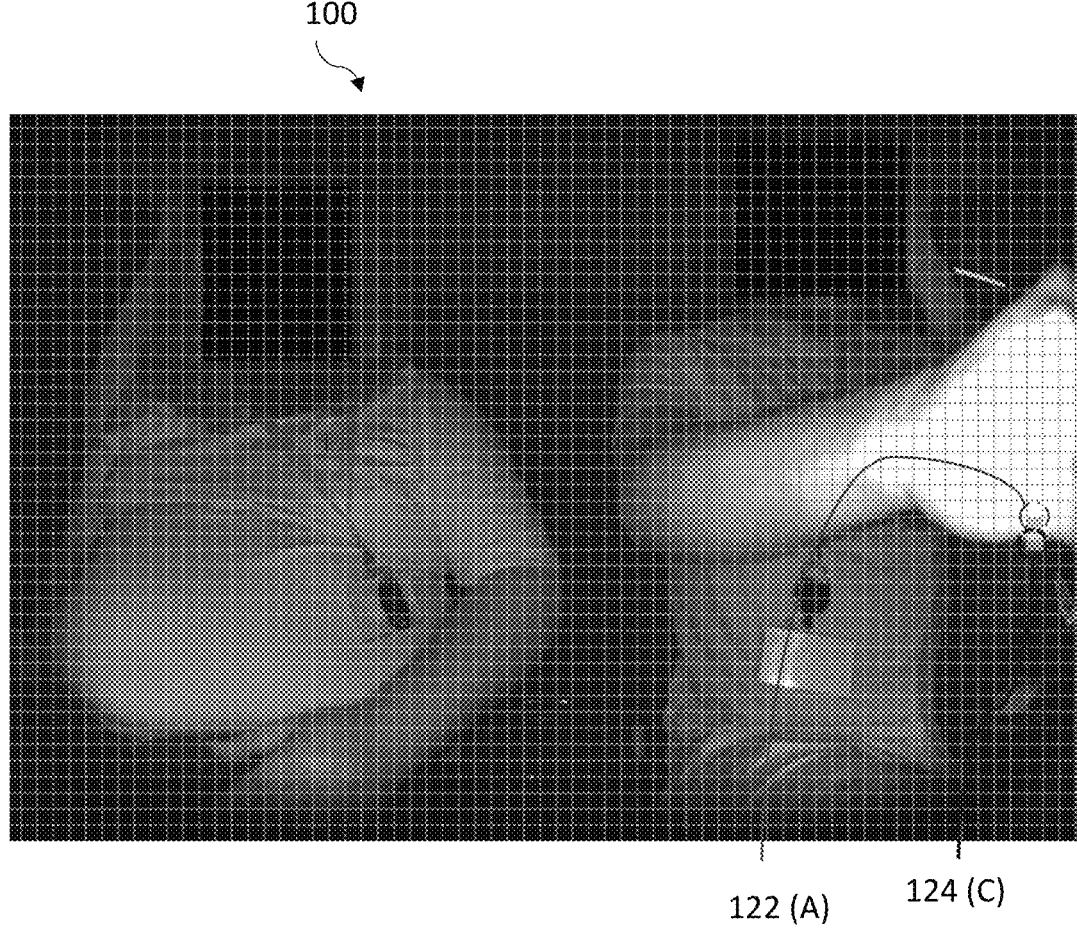
FIG. 5 shows the image of FIG. 2 along with a grid into which an image can be divided.

FIG. 5 shows the image 100 of FIG. 2 along with a grid into which an image is typically divided. As mentioned herein, the predefined upper/lower threshold may be used to determine whether regions are considered highly reflective as understood in the context of the present disclosure.

The grid represent several regions. Some regions have an average intensity which may be close to the predefined upper threshold (indicated by way of the dashed circle 124 at the border of the driver's arm/hand). If a rather high predefined upper threshold is set, such regions will likely have an intensity value lower than the predefined upper threshold and the number of detected highly reflective elements/regions may not be sufficient to have impact on the weighting coefficients (i.e. the high intensity count map will have only few zeros). On the other hand, if a rather low predefined upper threshold is set, likely too many regions may be (erroneously) detected as highly reflection regions, which could render the image dark.

Figure 6:
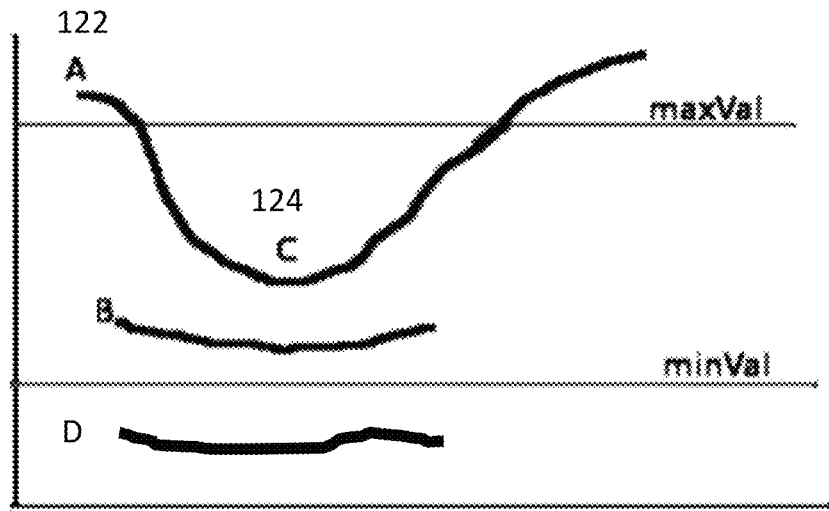
FIG. 6 shows an example hysteresis threshold.

To address this, according to the method described herein, a hysteresis threshold is employed. Thereby, two threshold values, minVal (predefined lower threshold) and maxVal (predefined upper threshold) are set (as best seen in FIG. 6). Any region with an intensity above maxVal is considered as highly reflective region (referred to herein as first region) (dash-dotted circle 122 in FIG. 5). Any region with an intensity below minVal is considered as non-saturated, and hence, not forming part of highly reflective regions.

Any region whose intensity value is between these two predefined thresholds, may be considered as saturated or non-saturated based on their connectivity: If regions are connected to saturated regions 122, they are considered to be part of saturated regions 124 (referred to herein as second region). Otherwise, they may not form part of the saturated regions (neither first nor second region).

Figure 7:
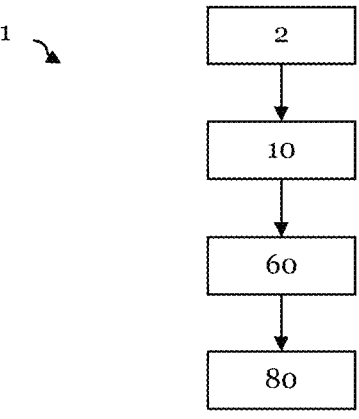
FIG. 7 shows an example method according to an embodiment of the present disclosure.

FIG. 7 shows an example computer-implemented method 1 for controlling the exposure time of an imaging device according to an embodiment of the present disclosure. The method 1 comprises:

obtaining 2 imaging data from the imaging device, the imaging data being grouped in one or more regions, wherein each region is associated with a weighting coefficient;

modifying 10 one or more of the weighting coefficients based on light intensity values obtained from the imaging data and being of the associated regions;

determining 60, based on the obtained imaging data and the weighting coefficients, a light intensity value for at least a part of the imaging data;

adapting 80, based on the light intensity value, the exposure time of the imaging device.

As described elsewhere herein, the computer-implemented method 1 of FIG. 7 may be employed as part of the in the computer-implemented method for sensing an interior environment of a vehicle, a cabin of a vehicle (such as a car).

In the embodiments, examples and/or aspects described herein, it is understood that all thresholds may be configurable in a flexible manner.

Embodiments of the present disclosure may be realized in any of various forms. For example, in some embodiments, the present disclosure may be realized as a computer-implemented method, a computer-readable memory medium, or a computer system.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. In particular, with reference to the appended claims, features from dependent claims may be combined with those of the independent claims and features from respective independent claims may be combined in any appropriate manner and not merely in the specific combinations enumerated in the appended claims.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A computer-implemented method for controlling an exposure time of an imaging device, the computer-implemented method comprising:
   obtaining imaging data from the imaging device, wherein the imaging data is grouped in one or more regions, and wherein each region is associated with a weighting coefficient;
   modifying one or more of the weighting coefficients based on light intensity values obtained from the imaging data and being of the associated regions;
   determining, based on the obtained imaging data and the weighting coefficients, a light intensity value for at least a part of the imaging data;
   excluding, from determining the light intensity value:
      one or more first regions having a light intensity above a predefined upper threshold, and
      one or more second regions having a light intensity above a predefined lower threshold, in response to the one or more second regions neighboring at least one of the one or more first regions,
      wherein the predefined lower threshold is lower than the predefined upper threshold; and
   adapting, based on the light intensity value, the exposure time of the imaging device.

2. The computer-implemented method of claim 1 wherein excluding at least one of the first or second regions further requires that at least one of the first or second regions have a light intensity above at least one of the predefined upper threshold or above the predefined lower threshold at least N times for N consecutive imaging data of a sequence of frames obtained by the imaging device.

3. The computer-implemented method of claim 1 wherein modifying one or more of the weighting coefficients includes increasing each value of the weighting coefficients in response to the light intensity value of the associated region being above a first threshold.

4. The computer-implemented method of claim 3 wherein modifying one or more of the weighting coefficients includes decreasing each value of the weighting coefficients in response to the light intensity value of the associated region being lower than a second threshold.

5. The computer-implemented method of claim 4 wherein the first threshold is greater than the second threshold.

6. The computer-implemented method of claim 1 wherein modifying one or more of the weighting coefficients includes modifying the values of the weighting coefficients based on a functional relationship to the light intensity of the associated regions.

7. The computer-implemented method of claim 6 wherein modifying the values of the weighting coefficients is based on a sigmoid-shaped transfer function.

8. The computer-implemented method of claim 2 wherein excluding at least one of the first or second regions is based on motion tracking information of at least one of the first or second regions.

9. The computer-implemented method of claim 8 further comprising:
   obtaining additional information of at least one of the imaging data or of the imaging device; and
   enabling or disabling, based on the obtained additional information, excluding at least one of the first or second regions.

10. The computer-implemented method of claim 9 wherein the additional information includes at least one of:
   an exposure time of the imaging device of one or more preceding imaging data;
   motion tracking information; or
   motion tracking information indicative of a moving object over one or more consecutive imaging data of a sequence of frames obtained by the imaging device.

11. The computer-implemented method of claim 10 wherein:
   the motion tracking information is over one or more consecutive imaging data of a sequence of frames obtained by the imaging device; and
   the moving object is a part of a human body.

12. The computer-implemented method of claim 1 wherein adapting the exposure time of the imaging device includes:
   increasing the exposure time of the imaging device in response to the determined light intensity value for at least a part of the imaging data being lower than an image threshold; and decreasing the exposure time of the imaging device in response to the determined light intensity value for at least a part of the imaging data being above the image threshold.

13. The computer-implemented method of claim 1 further comprising:

obtaining further imaging data based on the adapted exposure time of the imaging device; and determining, based on the imaging data, one or more characteristics of an interior environment of a vehicle.

14. The computer-implemented method of claim 13 wherein determining one or more characteristics of the interior environment of the vehicle includes at least one of:

determining whether a driver of the vehicle is alert/awake, drowsy, microsleeping, or sleeping;

determining a number of passengers of the vehicle; or determining a gaze direction of the driver.

15. A data processing apparatus comprising:

a computer-readable medium storing instructions; and at least one processor configured to execute the instructions, wherein the instructions include:

obtaining imaging data from an imaging device, wherein the imaging data is grouped in one or more regions, and wherein each region is associated with a weighting coefficient;

modifying one or more of the weighting coefficients based on light intensity values obtained from the imaging data and being of the associated regions;

determining, based on the obtained imaging data and the weighting coefficients, a light intensity value for at least a part of the imaging data;

excluding, from determining the light intensity value:

one or more first regions having a light intensity above a predefined upper threshold, and one or more second regions having a light intensity above a predefined lower threshold, in response to the one or more second regions neighboring at least one of the one or more first regions, wherein the predefined lower threshold is lower than the predefined upper threshold; and adapting, based on the light intensity value, an exposure time of the imaging device.

16. A vehicle comprising the data processing apparatus of claim 15.

17. The vehicle of claim 16 further comprising an imaging device.

18. A non-transitory computer-readable medium comprising instructions including:

obtaining imaging data from an imaging device, wherein the imaging data is grouped in one or more regions, and wherein each region is associated with a weighting coefficient;

modifying one or more of the weighting coefficients based on light intensity values obtained from the imaging data and being of the associated regions;

determining, based on the obtained imaging data and the weighting coefficients, a light intensity value for at least a part of the imaging data;

excluding, from determining the light intensity value:

one or more first regions having a light intensity above a predefined upper threshold, and one or more second regions having a light intensity above a predefined lower threshold, in response to the one or more second regions neighboring at least one of the one or more first regions, wherein the predefined lower threshold is lower than the predefined upper threshold; and adapting, based on the light intensity value, an exposure time of the imaging device.

* * * * *